May 23, 1933.  M. W. NEWBERRY  1,910,038
POWER TRANSMISSION MECHANISM
Filed July 28, 1932  4 Sheets-Sheet 4
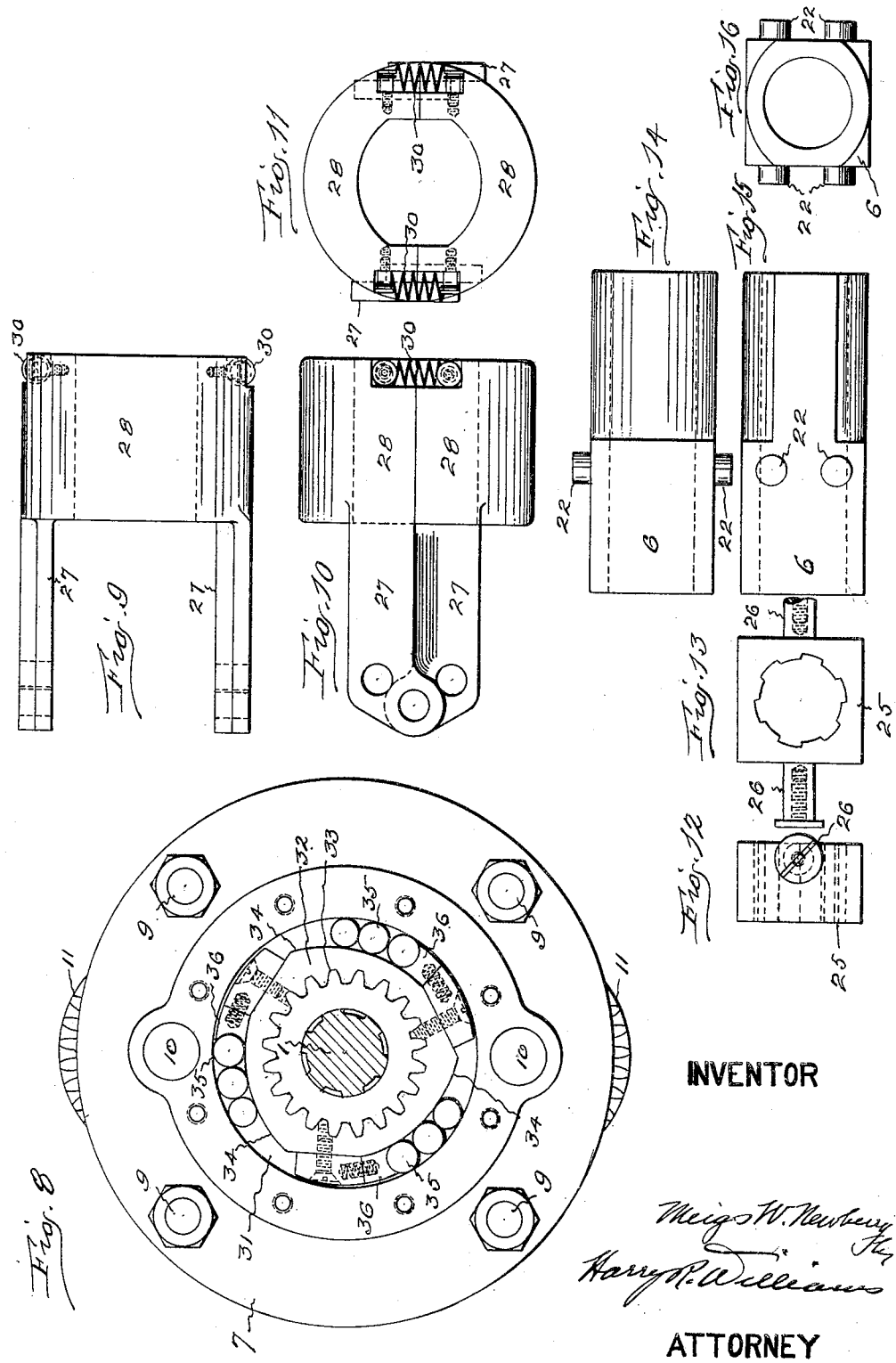
INVENTOR
ATTORNEY Patented May 23, 1933

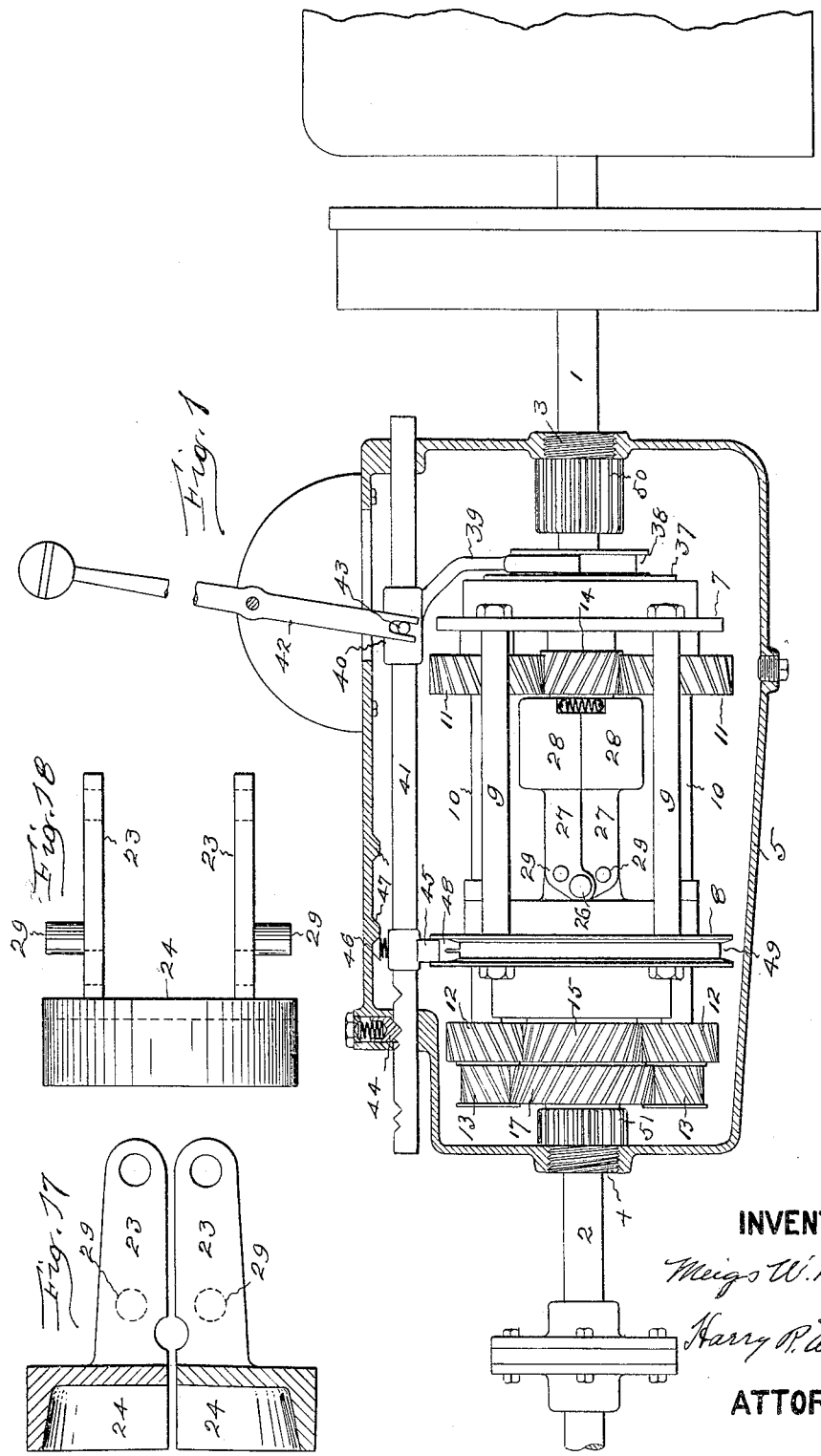

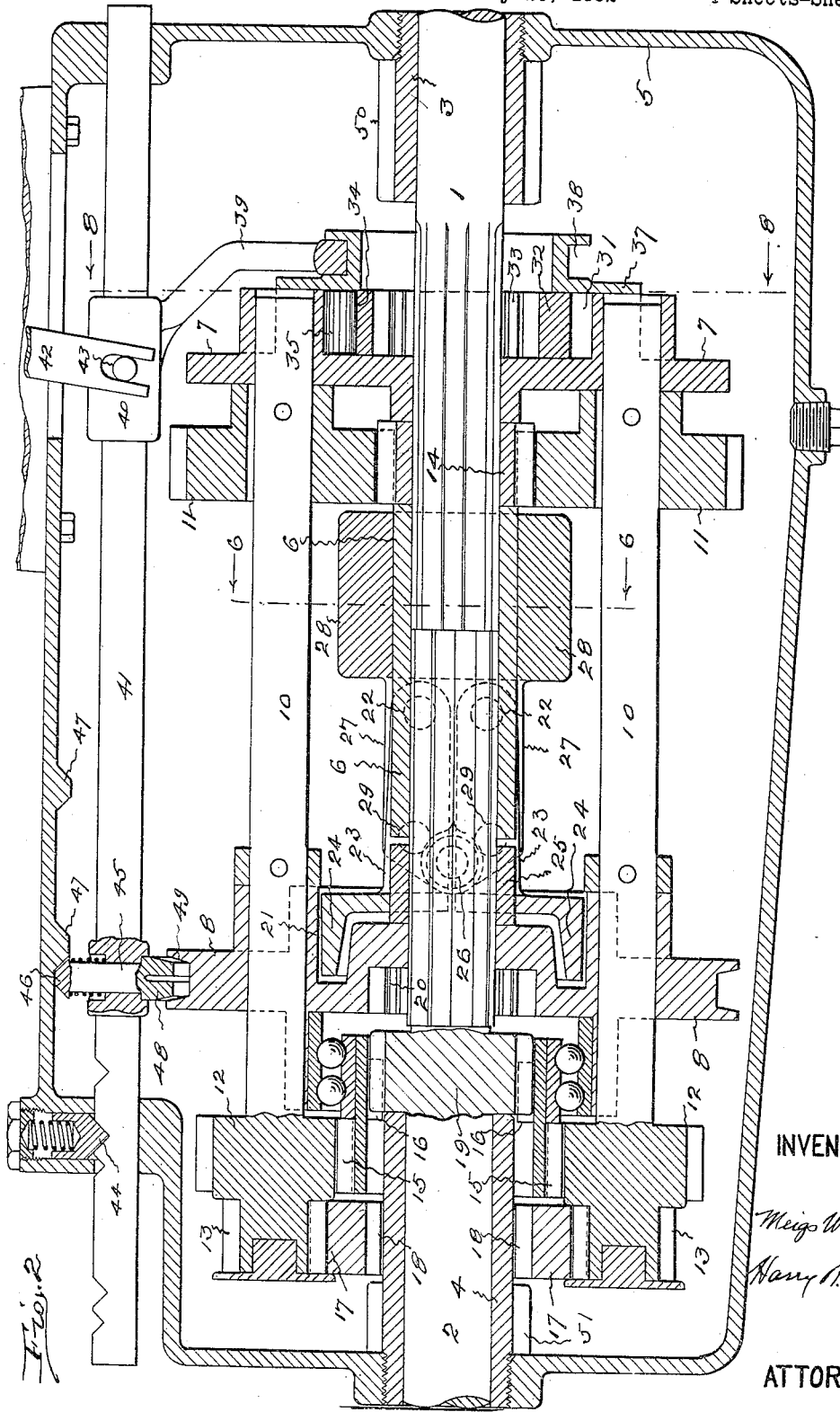

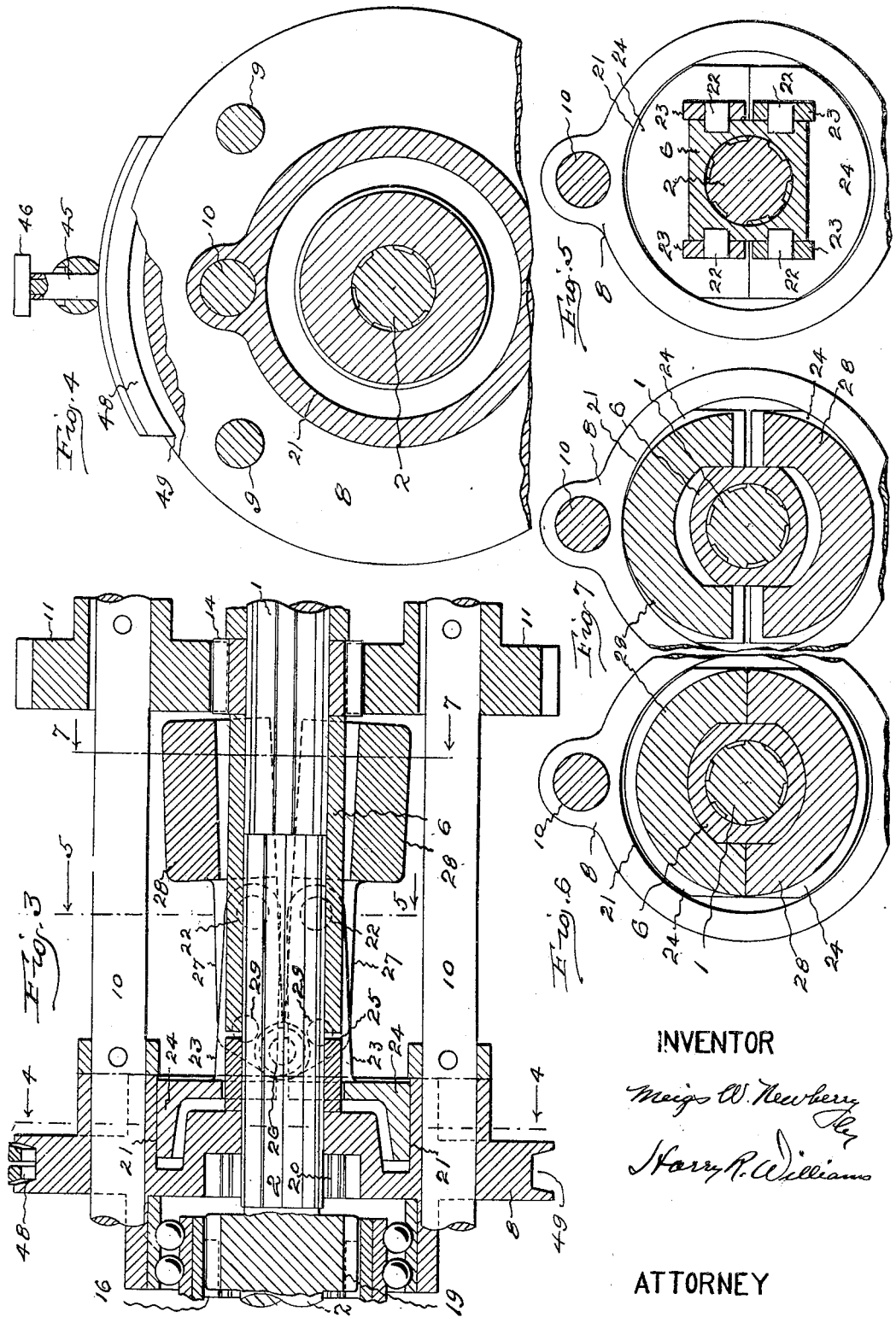

1,910,038

UNITED STATES PATENT OFFICE

MEIGS W. NEWBERRY, OF SOUTH WINDSOR, CONNECTICUT

POWER TRANSMISSION MECHANISM

Application filed July 28, 1932. Serial No. 625,236.

This invention relates to the mechanism which is employed in automobiles for transmitting power from the engine to the differential.

The object of the invention is to provide a relatively inexpensive, quiet, durable, and easily manipulated combined clutch and planetary gear construction by means of which the speed of the driven shaft will automatically increase from low to high without the manual shifting of gears by the operator.

This object is attained by so mounting and mating gears and controlling their effective action by positive and centrifugally operating clutch members that on the start and at low speeds the rotation of the driving shaft is transmitted to the load shaft at reduced rate by the rotation of the gears, but as the speed of the vehicle increases the centrifugal clutch automatically operates to hold the gears so that the gears and clutch revolve as a unit and drive the load shaft at the same speed as the driving shaft.

In the accompanying drawings

Fig. 1 illustrates a side elevation, with the enclosing case cut away, of a transmission which embodies this invention.

Fig. 2 on larger scale shows a central vertical longitudinal section of the gearing with the elements in neutral condition, that is, with the positive clutches disengaged as when the engine is allowed to run idle.

Fig. 3 is a section showing the position of the parts when the automatic clutch is engaged, as when the transmission is driving the vehicle at full speed.

Fig. 4 is a section taken on the plane indicated by the dotted line 4—4 on Fig. 3, with the male member of the automatic clutch removed.

Fig. 5 is a section on the plane indicated by the dotted line 5—5 on Fig. 3, showing the automatic clutch members.

Fig. 6 is a section on the plane indicated by the dotted line 6—6 on Fig. 2, this view showing the automatic clutch weights drawn in and the clutch disengaged.

Fig. 7 is a section taken on the dotted line 7—7 on Fig. 3 showing the weights out as when the automatic clutch is engaged.

Fig. 8 is a section on the plane indicated by the dotted line 8—8 on Fig. 2.

Fig. 9 is a plan of the automatic clutch operating weights.

Fig. 10 is a side view of the clutch operating weights.

Fig. 11 is an end view of the operating weights.

Fig. 12 is a side view of the collar to which the clutch operating weights are pivoted.

Fig. 13 is an end view of the collar.

Fig. 14 is a plan of the sleeve to which the male clutch members are pivoted.

Fig. 15 is a side view of the sleeve.

Fig. 16 is an end view of this sleeve.

Fig. 17 is a section of the male members of the centrifugal clutch.

Fig. 18 is a plan of the same.

In the structure illustrated the driving shaft 1 and the driven shaft 2 are axially aligned with each other, the former turning in a bearing bushing 3 and the latter turning in a bearing bushing 4, which bushings are secured in the ends of the enclosing case 5 that is adapted to be fastened to the vehicle frame in any convenient manner. Surrounding the joint at the abutting ends of the shafts is a sleeve 6. The bore of this sleeve has a free fit on the ends of both shafts, and a section of the sleeve has a rectangular outline.

On the driving shaft 1 is a disk 7 and on the driven shaft 2 is a disk 8. These disks have a free fit on the shafts and they are connected by tie-bolts 9 so as to form a cage. Shafts 10 are journalled in these disks and extend parallel diametrically opposite to each other. Fastened to the shafts adjacent to the disk 7 are gears 11, and at the other ends of the shafts are gears 12 and 13. The gears 11 mesh with a pinion 14 that is splined on the driving shaft. The gears 12 mesh with an annular pinion 15 that has internal clutch teeth 16 and the gears 13 mesh with an annular pinion 17 that has internal clutch teeth 18. On the driven shaft 2 is a toothed clutch member 19.

In one face of the disk 8 are internal clutch teeth 20, and in the other face of this disk is a recess the peripheral wall 21 of which forms the female member of a friction clutch.

Pivotally mounted on studs 22 projecting from the sleeve 6 are the ends of pairs of arms 23 that extend from the male members 24 of the friction clutch. These male clutch members are substantially semi-cylindrical and are adapted at the proper times to engage with the wall 21 of the female clutch member.

Splined on the driven shaft is a collar 25 and pivoted on studs 26 that project from this collar are the ends of pairs of arms 27 that extend from weights 28. Studs 29 connect the weight arms with the clutch arms so that when the weights are thrown out by centrifugal action they cause the male members of the clutch to be expanded very tightly against the female member of the clutch. Springs 30 are connected between the weights 28 to normally retain them drawn inward. Figs. 10, 11.

In a face of the disk 7 is a recess 31 in which is located a friction clutch plate 32 that has internal clutch teeth 33. This plate has eccentric surfaces 34 and between these eccentric surfaces and the inner wall of the recess in the disk 7 are friction rolls 35. Spring pressed shoes 36 tend to retain the rolls in the narrowest portion of the space between the plate and recess wall. Fig. 8. These elements are arranged so that the relative movements of the disk and plate can be in one direction only.

Fastened to the disk 7 over this recess is a plate 37 with a grooved collar 38, and engaging the groove in this collar is a forked arm 39 that extends from a sleeve 40 which is fastened to a bar 41. The forked end of a shifting lever 42 engages studs 43 that extend out from this sleeve. The bar has notches adapted to receive the end of a spring pressed bolt 44 that is mounted in a socket in the casing for retaining the bar in its various positions.

Carried by the bar is a spring plunger 45 the head 46 of which is adapted to be engaged by projections 47 on the interior of the casing. The inner end of the plunger carries a yielding arc-shaped brake shoe 48 which is adapted to enter the groove 49 in the disk 8. The projections 47 extending from the inner wall of the top of the casing are in such positions that when the bar is moved to certain positions the plunger is forced inward and the brake shoe caused to bind against the walls of the groove in the disk and hold the cage from revolving.

The cage comprised of the disks 7 and 8 and the tie-bolts 9, carries the shafts 10 with the gears 11, 12 and 13 and the roll clutch 34 in the disk 7, and by shifting the lever the cage with these parts can be moved longitudinally of the drive and driven shafts. As the cage with these parts is moved back and forth it also carries the gears 14, 15 and 17, the sleeve 6 and collar 25 with the centrifugally operated friction clutch and its weights. The bushing 3 that is fastened to the end of the casing and which supports the driving shaft 1 has clutch teeth 50, and the bushing 4 which is fastened to the other end of the casing and in which the driven shaft 2 turns, is provided with clutch teeth 51.

The parts are shown in the drawings, particularly Figs. 1 and 2, in the position which they occupy when all the clutches are disengaged so that the engine may run idle. When the shifting lever is drawn backward, through the bar 41, arm 39 and grooved collar 38 on the plate 37 that is attached to the disk 7 the cage and all of the parts it carries are moved forward as a unit. This movement causes the clutch teeth 33 in the cam plate 32 in the disk 7 to engage the fixed clutch teeth 50 on the bearing 3 so as to hold the cam plate stationary. The same movement also causes the clutch teeth 18 of the annular pinion 17 to move into engagement with the teeth of the clutch member 19 on the driven shaft 2. With the parts in this relation the rotation of the driving shaft is transmitted through the pinion 14, gears 11, shafts 10, gears 13, pinion 17 to the clutch member 19 on the driven shaft. Under these conditions the cage remains stationary and the speed of the driving shaft is transmitted to the driven shaft according to the ratios of the intermeshing rotating gears and pinions. This starts the vehicle at slow speed. As the speed of the vehicle picks up when it reaches a sufficiently rapid rate centrifugal action throws out the weights 28 and the male members 24 of the centrifugal clutch are caused to engage the female member 21 of this clutch. Under these conditions the cage with the gears it carries is caused to revolve and transmit its revolutions directly to the driven shaft at the same speed as the driving shaft.

In order to reverse the rotation of the driven shaft with relation to that of the driving shaft, the shifting lever is pushed forward. This movement disengages the clutch teeth 33 of the friction plate 32 from the fixed clutch teeth 50 on the bushing 3 and causes the engagement of the clutch teeth 18 in the pinion 17 with the clutch teeth 51 on the fixed bushing 4. It also causes the engagement of the clutch teeth 20 in the disk 8 with the teeth of the clutch member 19 on the drive shaft. With the elements in these relative positions the cage with the elements it carries is caused to revolve in a direction reverse to the rotation of the driving shaft, which causes the driven shaft to rotate in the reverse direction.

With this construction the only shift which is required is to set the clutches for forward motion or for backward motion of the vehicle. The gears are never thrown out of mesh, and the change of speed from the start and slow running to fast running and vice versa, is automatically accomplished by the action of the centrifugal clutch.

When it is desired to retard the vehicle by the engine compression, as when running down hill, under which condition the drive shaft tends to run faster than and turn the driven shaft, the shifting lever may be set so that the plunger 45 on the bar 41 will engage with and be pressed down by one of the projections 47 on the inner wall of the casing and cause the brake 48 to set and hold the disk 8 from rotation. Under these conditions the rotation of the driven shaft 2 is resisted by the action of the engine compression on the driving shaft 1 according to the ratios of the gears. This may be accomplished either at high or low speeds.

It is to be understood that the specific construction illustrated and described is merely representative of the invention, and that such modifications of the structure as may be perceived by those skilled in the art, for example, the structure would operate in the same manner if there was but one of the shafts 10 with its gears 11, 12 and 13, come within the scope of the invention set forth in the claims. It is also to be understood that the invention is applicable to other uses than for transmitting power from the engine to the differential shaft of an automobile, as it may be used in connection with other mechanisms than an automobile where it is desired to automatically cause a change of speed between the driving and driven shafts.

The invention claimed is:—

1. A power transmission which comprises a casing supporting aligned driving and driven shafts with a pinion on the driving shaft and a clutch member on the driven shaft, positive clutch members fixed to the casing, a cage rotatable on and movable longitudinally of said shafts and carrying positive clutch members adapted to engage with said fixed clutch members, said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit.

2. A power transmission which comprises a casing supporting aligned driving and driven shafts with a pinion on the driving shaft and a clutch member on the driven shaft, positive clutch members fixed to the casing, a cage rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, and a clutch member carried by the cage and adapted to engage with the clutch member on the driven shaft when the cage is moved to its backward limit.

3. A power transmission which comprises a casing supporting aligned driving and driven shafts with a pinion on the driving shaft and a clutch member on the driven shaft, positive clutch members fixed to the casing, a cage rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a friction clutch member carried by said cage and rotatable about said driven shaft, and a friction clutch member rotatable with the driven shaft and adapted by centrifugal action to be engaged with said friction clutch member.

4. A power transmission which comprises a casing supporting aligned driving and driven shafts with a pinion on the driving shaft and a clutch member on the driven shaft, positive clutch members fixed to the casing, a cage rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a female clutch member carried by the cage and adapted to engage with the clutch member on the driven shaft when the cage is moved to its backward limit, and a male clutch member rotatable with the driven shaft and adapted by centrifugal action to be engaged with said female clutch member.

5. A power transmission which comprises a casing supporting aligned driving and driven shafts with a pinion on the driving shaft and a clutch member on the driven shaft, positive clutch members fastened in each end of the casing, a cage rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a friction clutch member carried by the cage, a friction clutch member rotatable with the driven shaft, and weights rotatable with the driven shaft and adapted to cause the engagement of said friction clutch members.

6. A power transmission which comprises a casing supporting aligned driving and driven shafts with a pinion on the driving shaft and a clutch member on the driven shaft, a cage rotatable on and movable longitudinally of said shafts, said cage carrying a shaft with a gear engaged with the pinion on the driving shaft and a gear normally disengaged from the clutch member on the driven shaft, said latter gear adapted to be engaged with the clutch member on the driven shaft when the cage is moved to its forward limit.

7. A power transmission which comprises a casing supporting aligned driving and driven shafts with a pinion on the driving shaft and a clutch member on the driven shaft, a positive clutch member fixed to the casing, a cage rotatable on and movable longitudinally of said shafts and carrying a positive clutch member adapted to engage with said fixed clutch member and a roll clutch located between the cage and the positive clutch member it carries and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit.

8. A power transmission which comprises a casing supporting aligned driving and driven shafts with a pinion on the driving shaft and a clutch member on the driven shaft, positive clutch members fixed to the casing, a cage rotatable on and movable longitudinally of said shafts and carrying positive clutch members at its ends adapted to engage with said fixed clutch members and a roll clutch located between the cage and the positive clutch member at its forward end, and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit.

9. A power transmission which comprises a casing supporting aligned driving and driven shafts with a pinion on the driving shaft and a clutch member on the driven shaft, positive clutch members fixed to the casing, a cage rotatable on and movable longitudinally of said shafts and carrying positive clutch members at its ends adapted to engage with said fixed clutch members and a roll clutch located between the cage and the positive clutch member at its forward end, and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a friction clutch member carried by said cage and rotatable about said driven shaft, and a friction clutch member rotatable with the driven shaft and adapted by centrifugal action to be engaged with said friction clutch member.

10. A power transmission which comprises a casing supporting aligned driving and driven shafts with a pinion on the driving shaft and a clutch member on the driven shaft, positive clutch members fastened in each end of the casing, a cage rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a friction clutch member carried by the cage, a friction clutch member rotatable with the driven shaft, weights rotatable with the driven shaft and adapted to cause the engagement of said friction clutch members, and a brake adapted to be engaged with said cage to prevent its revolution.

11. A power transmission which comprises a casing supporting aligned driving and driven shafts with a pinion on the driving shaft and a clutch member on the driven shaft, positive clutch members fastened in each end of the casing, a cage rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a friction clutch member carried by the cage, a friction clutch member rotatable with the driven shaft, and weights rotatable with the driven shaft and adapted to cause the engagement of said friction clutch members, means for shifting the cage, and means carried by said shifting mechanism adapted to engage projections from the casing and prevent the rotation of the cage.

12. A power transmission which comprises a casing supporting aligned driving and driven shafts with a pinion on the driving shaft and a clutch member on the driven shaft, positive clutch members fixed to the casing, a cage composed of disks and tie rods rotatable on and movable longitudinally of said shafts and carrying positive clutch members adapted to engage with said fixed clutch members and said cage also carrying a shaft with a gear engaged with the pinion on the driving shaft and a gear normally disengaged from the clutch member on the driven shaft, said latter gear adapted to be engaged with the clutch member on the driven shaft when the cage is moved to its forward limit and to be held from rotation by the engagement of positive clutch members when the cage is moved to its backward limit, a friction clutch member carried by one of said disks, and a friction clutch member rotatable with the driven shaft and adapted by centrifugal action to be engaged with said disk friction clutch member.

13. A power transmission which comprises a casing supporting aligned driving and driven shafts with a pinion splined to the driving shaft and a clutch member fixed to the driven shaft, a cage rotatable on and movable longitudinally of said shafts, said cage carrying a shaft with a gear engaged with the pinion splined on the driving shaft and a gear normally disengaged from the clutch member on the driven shaft, said latter gear adapted to be engaged with the clutch member on the driven shaft when the cage is moved to its forward limit.

14. A power transmission which comprises a casing supporting aligned driving and driven shafts with a pinion splined to the driving shaft and a clutch member fixed to the driven shaft, a cage rotatable on and movable longitudinally of said shafts and carrying a shaft with a gear engaged with the splined pinion on the driving shaft and a gear normally disengaged from the clutch member on the driven shaft, said latter gear adapted to be engaged with the clutch member on the driven shaft when the cage is moved to its forward limit, a friction clutch member rotatable with the cage about the driven shaft, a friction clutch member rotatable with the driven shaft, means for engaging said friction clutch members, said friction clutch members being movable longitudinally of the shafts with the cage, and a positive clutch member carried by one member of the friction clutch and adapted to engage with the clutch member on the driven shaft when the cage is in its backward position.

15. A power transmission which comprises a casing supporting aligned driving and driven shafts with a pinion on the driving shaft and a clutch member on the driven shaft, disks rotatable on and movable longitudinally of said shafts, one of said disks carrying a positive clutch member and a friction clutch member and said disks also carrying a shaft with a gear engaged with the pinion on the driving shaft and a gear normally disengaged from the clutch member on the driven shaft, said latter gear adapted to be engaged with the clutch member on the driven shaft when the disks are moved to their forward limit, said positive clutch member adapted to engage with the clutch member on the driven shaft when the disks are moved to their backward limit, and a friction clutch member rotatable with the driven shaft and adapted by centrifugal action to be engaged with the first mentioned friction clutch member.

16. A power transmission which comprises a casing supporting aligned driving and driven shafts with a pinion on the driving shaft and a clutch member on the driven shaft, a cage composed of disks and tie rods rotatable on and movable longitudinally of said shafts and carrying a shaft with a gear engaged with the pinion on the driving shaft and a gear normally disengaged from the clutch member on the driven shaft, said latter gear adapted to be engaged with the clutch member on the driven shaft when the cage is moved to its forward limit, a friction clutch member carried by one of said disks, and a friction clutch member rotatable with the driven shaft and adapted by centrifugal action to be engaged with said disk friction clutch member.

17. A power transmission which comprises a casing supporting aligned driving and driven shafts with a pinion on the driving shaft and a clutch member on the driven shaft, disks rotatable on and movable longitudinally of said shafts and one of said disks carrying a positive clutch member and a friction clutch member and the other of said disks carrying a positive clutch member and a roll clutch member between said disk and positive clutch member and said disks also carrying a shaft with a gear engaged with the pinion on the driving shaft and a gear normally disengaged from the clutch member on the driven shaft, said latter gear adapted to be engaged with the clutch member on the driven shaft when the disks are moved to their forward limit and said positive clutch member adapted to engage with the clutch member on the driven shaft when the disks are moved to their backward limit, and a friction clutch member rotatable with the driven shaft and adapted by centrifugal action to be engaged with the first mentioned friction clutch member.

18. A power transmission which comprises a casing supporting aligned driving and driven shafts with a pinion movable longitudinally of each shaft, and one shaft being provided with a positive clutch member, means movable longitudinally of the shafts and rotatable thereabout, said means carrying a shaft provided with gears which engage said pinions at all times, said means also carrying a positive clutch member adapted to engage a positive clutch member fixed to the casing when the said means is moved in one direction, and carrying a positive clutch member adapted to engage the positive clutch member fixed to the shaft when said means is moved in the opposite direction.

19. A power transmission which comprises a casing supporting aligned driving and driven shafts with a pinion movable longitudinally of each shaft, and one shaft being provided with a positive clutch member, means movable longitudinally of the shafts and rotatable thereabout, said means carrying a shaft provided with gears which engage said pinions at all times, said means also carrying a positive clutch member adapted to engage a positive clutch member fixed to the casing when the said means is moved in one direction, and carrying a positive clutch member adapted to engage the positive clutch member fixed to the shaft when said means is moved in the opposite direction, and one pinion having a clutch member that is adapted to engage a positive clutch member fixed to the casing when said means is moved in said opposite direction.

20. A power transmission which comprises a casing supporting aligned driving and driven shafts with a pinion movable longitudinally of each shaft, and one shaft being provided with a positive clutch member, means movable longitudinally of the shafts and rotatable thereabout, said means carrying a shaft provided with gears which engage said pinions at all times, said means also carrying a positive clutch member adapted to engage a positive clutch member fixed to the casing when the said means is moved forward, and carrying a positive clutch member adapted to engage the positive clutch member fixed to the shaft when said means is moved backward, one pinion having a clutch member adapted to engage the positive clutch member fixed to the shaft when said means is moved forward, and adapted to engage a clutch member fixed to the casing when said means is moved backward.

MEIGS W. NEWBERRY.